(12) United States Patent
Sugihara et al.

(10) Patent No.: US 12,466,944 B2
(45) Date of Patent: Nov. 11, 2025

(54) CORE/SHELL TYPE POLYMER MICROPARTICLES, DISPERSION OF PARTICLES, AND METHOD FOR PRODUCING SAID MICROPARTICLES

(71) Applicant: MARUZEN PETROCHEMICAL CO., LTD., Chuo-ku (JP)

(72) Inventors: Shinji Sugihara, Fukui (JP); Takao Nishiura, Ichihara (JP); Kento Fujiura, Ichihara (JP)

(73) Assignee: MARUZEN PETROCHEMICAL CO., LTD., Chuo-ku (JP)

( * ) Notice: Subject to any disclaimer, the term of this patent is extended or adjusted under 35 U.S.C. 154(b) by 1048 days.

(21) Appl. No.: 16/976,955

(22) PCT Filed: Mar. 7, 2018

(86) PCT No.: PCT/JP2018/008683
§ 371 (c)(1),
(2) Date: Aug. 31, 2020

(87) PCT Pub. No.: WO2019/171480
PCT Pub. Date: Sep. 12, 2019

(65) Prior Publication Data
US 2021/0002468 A1 Jan. 7, 2021

(51) Int. Cl.
*C08L 29/10* (2006.01)
*C08F 2/22* (2006.01)
*C08F 261/06* (2006.01)

(52) U.S. Cl.
CPC ............... *C08L 29/10* (2013.01); *C08F 2/22* (2013.01); *C08F 261/06* (2013.01); *C08L 2207/53* (2013.01)

(58) Field of Classification Search
None
See application file for complete search history.

(56) References Cited

U.S. PATENT DOCUMENTS

2005/0171289 A1   8/2005  Kataoka et al.
2008/0220970 A1*  9/2008  Martin ................... A01N 25/28
                                                      504/116.1
(Continued)

FOREIGN PATENT DOCUMENTS

JP   6-228491 A   8/1994
JP   7-331224 A   12/1995
(Continued)

OTHER PUBLICATIONS

JP 2008050499A machine translation (Year: NA) (Year: NA).*
(Continued)

*Primary Examiner* — Rachel Kahn
(74) *Attorney, Agent, or Firm* — Oblon, McClelland, Maier & Neustadt, L.L.P.

(57) ABSTRACT

Provided are core/shell type polymeric particles including a shell and a core, in which the particles can be produced by a method using neither a surfactant nor a high-molecular-weight azo initiator, exhibit satisfactory dispersibility in aqueous medium, and are useful as, for instance, a dispersant, a metal-protecting stabilizer, or a metal adsorbent. A core/shell type polymeric particle including a shell including a hydrophilic vinyl ether polymer (a) and a core including a hydrophobic polymer (b).

6 Claims, 10 Drawing Sheets

SEM IMAGE

TEM IMAGE

(56) References Cited

U.S. PATENT DOCUMENTS

| | | | |
|---|---|---|---|
| 2015/0005467 A1 | | 1/2015 | Sugihara et al. |
| 2017/0022408 A1* | | 1/2017 | Zha .................... C09K 8/516 |
| 2020/0071443 A1* | | 3/2020 | Mori .................... C08J 9/24 |

FOREIGN PATENT DOCUMENTS

| | | | |
|---|---|---|---|
| JP | 11-246611 A | | 9/1999 |
| JP | 2000-256408 A | | 9/2000 |
| JP | 2004-211052 A | | 7/2004 |
| JP | 2006-55781 A | | 3/2006 |
| JP | 2006-96857 A | | 4/2006 |
| JP | 2006-257139 A | | 9/2006 |
| JP | 2007056077 A | * | 3/2007 |
| JP | 2008-50500 A | | 3/2008 |
| JP | 2008050499 A | * | 3/2008 |
| JP | 2008-274045 A | | 11/2008 |
| JP | 2010-506984 A | | 3/2010 |
| JP | 5586885 B2 | | 9/2014 |
| JP | 5936184 B2 | | 6/2016 |
| SU | 897778 A1 | | 1/1982 |
| TW | 200706567 A | | 2/2007 |
| WO | WO 2008/032800 A1 | | 3/2008 |
| WO | WO 2016/181873 A1 | | 11/2016 |

OTHER PUBLICATIONS

Lanson et al (Poly(styrene)comb-b-Poly(ethylene oxide)comb Copolymers: Synthesis and AFM Investigation of Intra- and Supramolecular Organization as Thin Deposits. Macromolecules 2007, 40, 26, 9503-9509. (Year: 2007).*

Motoyanagi et al (Synthesis of well-defined poly(vinylether)-based macromonomers having pendant glycerols via living cationic polymerization and their application to the preparation of core-shell polymer particles. Polym Int 2014; 63: 459-464). (Year: 2014).*

Translation of JP 2007056077 (Year: NA).*

Extended European Search Report issued Sep. 27, 2021 in corresponding European Patent Application No. 18908542.6, 8 pages.

Sugihara Shinji et al., "Synthesis of Various Poly(2-hydroxyethyl vinyl ether)-Stabilized Latex Particles via Surfactant-Free Emulsion Polymerization in Water", Macromolecules, vol. 51, No. 4, XP055841343, Feb. 5, 2018, pp. 1260-1271.

Japanese Office Action issued Jan. 26, 2021 in Japanese Patent Application No. 2017-003278 (with English translation), 7 pages.

Combined Taiwanese Office Action and Search Report Issued Aug. 3, 2021 in Taiwanese Patent Application No. 107108093 (with unedited computer generated English translation), 13 pages.

International Search Report issued on Jun. 5, 2018 in PCT/JP2018/008683 filed on Mar. 7, 2018, 2 pages.

Ali, A. M. I. et al., "Synthesis of poly(2-hydroxypropyl methacrylate) latex particles via aqueous dispersion polymerization," Soft Matter, vol. 3, 2007, pp. 1003-1013.

Suzuki, A. et al., "Recent Status of PVA Protective Colloid in Polymer Latices," Nippon Gomu Kyokaishi (Journal of the Society of Rubber Science and Technology, Japan), vol. 79, 2006, pp. 67-72, 9 total pages (with partial English translation).

Sudo, M. et al., "One-Pot Synthesis of Core-Shell Particles Using Polyvinyl Ethers as Steric Stabilizer," Polymer Preprints, Japan, vol. 66, No. 2, 2017, 4 total pages (with English translation).

Sugihara, S. et al., "Synthesis of Various Poly(2-hydroxyethyl vinyl ether)-Stabilized Latex Particles via Surfactant-Free Emulsion Polymerization in Water," Macromolecules, vol. 51, 2018, pp. 1260-1271.

* cited by examiner

CORE/SHELL TYPE POLYMER MICROPARTICLES, DISPERSION OF PARTICLES, AND METHOD FOR PRODUCING SAID MICROPARTICLES

TECHNICAL FIELD

The present invention relates to core/shell type polymeric particles, a particle dispersion, and a method for producing the particles.

BACKGROUND ART

Polymeric particles have been known to exhibit excellent dispersibility and have been used as a dispersant for a coating material, an adhesive, a cosmetic, or the like. Of these, core/shell type polymeric particles have different kinds of high-molecular-weight compounds to form a core (center) and a shell (surface) of the particle. Accordingly, selection of the kind of each high-molecular-weight compound makes it possible to modify chemical characteristics of the core and the shell. Because of the characteristics, application to medical use such as a diagnostic agent or a drug delivery system, in addition to the above use, has been considered.

Generally, dispersion polymerization, suspension polymerization, or emulsion polymerization has been known as a process for producing polymeric particles (Patent Literatures 1 and 2). A surfactant has been used to maintain dispersibility of particles in each polymerization process. However, when the surfactant is used, the surfactant included in a reaction solution and the surfactant remaining on the particles may cause harmful effects on the environment upon disposal of the reaction solution or the particles.

Due to this, in the technology described in Non Patent Literature 1, instead of a surfactant, a comonomer is added to inhibit aggregation of particles. Unfortunately, when the comonomer, which is the third component, in addition to a core component and a shell component is so added, chemical characteristics of the particles are different from desired characteristics due to the comonomer-derived chemical structure, which may affect a function of interest.

In addition, Patent Literature 3 describes a process for subjecting a PEG-based high-molecular-weight azo initiator and a hydrophobic vinyl-based monomer to emulsion polymerization as a process for producing, without using a surfactant, core/shell type polymeric particles.

However, the above core/shell type polymeric particles are synthesized using a large amount of PEG-based high-molecular-weight azo initiator. Thus, a large amount of decomposition product of the high-molecular-weight azo initiator remains in the particles. The decomposition product of azo initiator has strong toxicity and as a result of which use of the particles is restricted depending on the purpose.

In addition, in the above core/shell type polymeric particles, the shell component is limited to a PEG-based high-molecular-weight azo initiator. Thus, there is a problem where it is difficult to modify chemical characteristics of the shell to desired characteristics. Further, in the case of industrial production, an increase in usage of the initiator causes a problem about the cost and the procurement of raw materials.

Furthermore, in the technology described in Non Patent Literature 2, commonly used hydrophilic polyvinyl alcohol (PVA) is used as a polymer for deriving a shell. This PVA is allowed to act as a dispersant, and vinyl acetate and/or methyl methacrylate are subjected to emulsion polymerization. This technique is used to synthesize core/shell type particles.

However, because polyvinyl alcohol particles cover the particles during polymerization, the particles obtained by the above technique are not particles (primary particles) with a size of 100 nm or more. Moreover, inter-molecular association of PVA affects its aggregation, which causes an increase in the particle size (generates secondary particles). As a result, the particle size distribution is broadened, leading to a problem of dispersion stability or exertion of function.

CITATION LIST

Patent Literatures

Patent Literature 1: JP 2008-274045 A
Patent Literature 2: JP 5586885 B2
Patent Literature 3: JP 2006-257139 A
Patent Literature 4: JP 5936184 B2

Non Patent Literatures

Non Patent Literature 1: Soft Matter, 2007, 3, 1003-1013
Non Patent Literature 2: NIPPON GOMU KYOKAISHI (Journal of the Society of Rubber Science and Technology, Japan), 2006, 79, 67-72

SUMMARY OF INVENTION

Technical Problem

Meanwhile, vinyl ether polymers have been known to exhibit biocompatibility and/or response to thermal stimulation, and should be applicable to a resin modifier, a metal-protecting stabilizer, a metal adsorbent, or medical use.

Many processes for polymerizing a vinyl ether compound have been investigated. A radical polymerization process using hydrophilic vinyl ether, in particular, a hydroxyl group-containing vinyl ether (Patent Literature 4) or a polyether structure-containing vinyl ether has recently been found. There has been very few applied research using this technology.

The present invention addresses the problem of providing a core/shell type polymeric particle including a shell and a core, which can be produced by a method using neither a surfactant nor a high-molecular-weight azo initiator, exhibits satisfactory dispersibility in aqueous medium, and is useful as, for instance, a dispersant, a metal-protecting stabilizer, or a metal adsorbent.

Solution to Problem

The present inventors conducted intensive research. As a result, they found that core/shell type polymeric particles including a shell containing a hydrophilic vinyl ether polymer (a) and a core containing a hydrophobic polymer (b) can be produced by a method using neither a surfactant nor a high-molecular-weight azo initiator, exhibit satisfactory dispersibility in aqueous medium, and are useful as, for instance, a dispersant, a metal-protecting stabilizer, or a metal adsorbent. In this way, the present invention has been completed.

Specifically, the present invention provides the following <1> to <10>.

<1> A core/shell type polymeric particle (hereinafter, also referred to as "particles of the invention") including a shell including a hydrophilic vinyl ether polymer (a) and a core including a hydrophobic polymer (b).

<2> The particle according to <1>, wherein the shell is composed of the hydrophilic vinyl ether polymer (a) and the core is composed of the hydrophobic polymer (b).

<3> The particle according to <1> or <2>, wherein the hydrophilic vinyl ether polymer (a) is represented by the following formula (1):

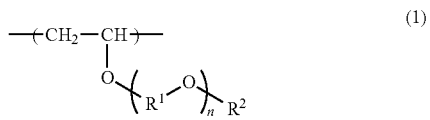

(1)

wherein $R^1$ represents a $C_{1-5}$ alkanediyl group, $R^2$ represents a hydrogen atom or a $C_{1-3}$ alkyl group, and n is an integer of 1 to 10.

<4> The particle according to any one of <1> to <3>, wherein a monomer as a component of the hydrophobic polymer (b) is one or more of monomer selected from consisting of an olefin, an aromatic vinyl compound, (meth)acrylic acid, a (meth)acrylic acid derivative, (meth)acrylamide, a (meth)acrylamide derivative, or a vinyl ester of saturated aliphatic carboxylic acid.

<5> The particle according to any one of <1> to <4>, which has an average particle size of from 100 to 2000 nm.

<6> The particle according to any one of <1> to <5>, wherein the hydrophilic vinyl ether polymer (a) and the hydrophobic polymer (b) are each a linear polymer.

<7> The particle according to any one of <1> to <6>, which is produced by subjecting a hydrophilic vinyl ether polymer and a hydrophobic monomer to emulsion polymerization in an aqueous medium.

<8> A particle dispersion (hereinafter, also referred to as "particle dispersion of the invention") comprising particles according to any one of <1> to <7> dispersed therein.

<9> A method for producing core/shell type polymeric particles (hereinafter, also referred to as a "particle production method of the invention"), including a polymerization step of subjecting a hydrophilic vinyl ether polymer and a hydrophobic monomer to emulsion polymerization in an aqueous medium.

<10> The method according to <9>, wherein the polymerization step is carried out in absence of a surfactant.

Advantageous Effects of Invention

Particles of the invention can be produced by a method using neither a surfactant nor a high-molecular-weight azo initiator, exhibit satisfactory dispersibility in aqueous medium, and are useful as, for instance, a dispersant, a metal-protecting stabilizer, or a metal adsorbent.

When neither a surfactant nor a high-molecular-weight azo initiator is used in a particle production method of the invention, the core/shell type polymeric particles, which exhibit satisfactory dispersibility in aqueous medium and are useful as, for instance, a dispersant, a metal-protecting stabilizer, or a metal adsorbent, can be produced in a simple and industrially advantageous manner.

DESCRIPTION OF EMBODIMENTS

[Polymeric Particles]

Figure 1:
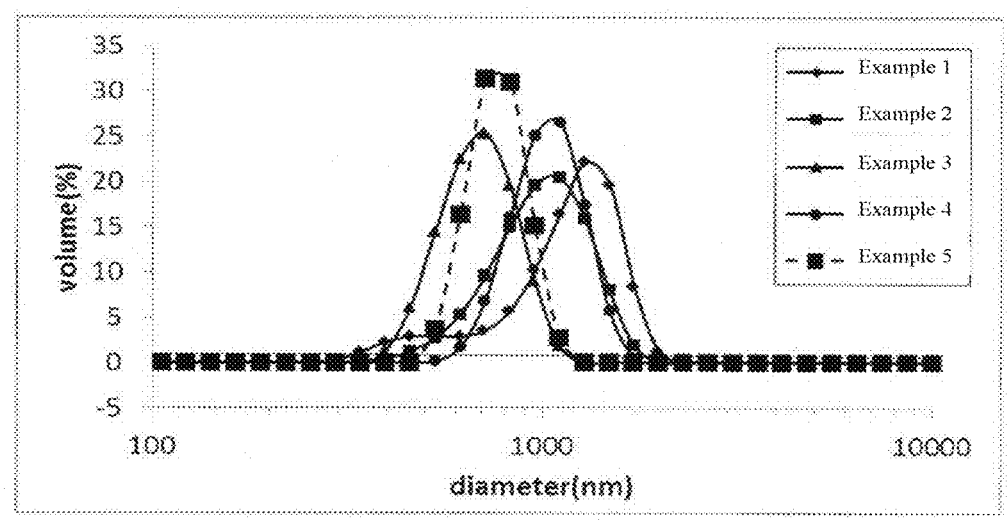
FIG. 1 is a graph showing DLS data of particles obtained in Examples 1 to 5.

Each particle of the invention is a core/shell type polymeric particle including a shell including a hydrophilic vinyl ether polymer (a) and a core including a hydrophobic polymer (b). First, the particles of the invention will be described in detail.

In a particle of the invention, a shell is provided to cover a part or the entire surface of a core. In the particle of the invention, it is preferable from the viewpoints of low toxicity and multifunctional characteristics that the shell is composed of a hydrophilic vinyl ether polymer (a) and the core is composed of a hydrophobic polymer (b).

As the hydrophilic vinyl ether polymer (a), a compound represented by the following formula (1) is preferable.

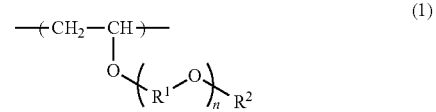

(1)

wherein $R^1$ represents a $C_{1-5}$ alkanediyl group, $R^2$ represents a hydrogen atom or a $C_{1-3}$ alkyl group, and n is an integer of 1 to 10.

In formula (1), the number of carbon atoms in the alkanediyl group represented by $R^1$ is preferably from 2 to 4, more preferably 2 or 3, and particularly preferably 2. The alkanediyl group may be linear or branched. Specific examples include a methane-1,1-diyl group, an ethane-1,1-diyl group, an ethane-1,2-diyl group, a propane-1,1-diyl group, a propane-1,2-diyl group, a propane-1,3-diyl group, a propane-2,2-diyl group, a butane-1,4-diyl group, or a pentane-1,5-diyl group.

The number of carbon atoms in the alkyl group represented by $R^2$ is preferably 1 or 2. The alkyl group may be linear or branched. Specific examples include a methyl group, an ethyl group, an n-propyl group, or an isopropyl group. Among them, as the alkyl group, a methyl group or an ethyl group is preferable, and a methyl group is more preferable.

Here, n is an integer of 1 to 10 and an integer of 1 to 6 is preferable, an integer of 1 to 4 is more preferable, and an integer of 1 to 3 is particularly preferable. Note that when n is an integer of 2 to 10, each $R^2$ moieties may be the same or different.

It is preferable to use a monofunctional vinyl ether compound as a monomer constituting the hydrophilic vinyl ether polymer (a).

Specific examples of the above monomer include 2-hydroxyethyl vinyl ether, 3-hydroxypropyl vinyl ether, 4-hydroxybutyl vinyl ether, diethylene glycol monovinyl ether, 2-methoxyethyl vinyl ether, 2-ethoxyethyl vinyl ether, 2-(2-methoxyethoxy)ethyl vinyl ether, 2-(2-ethoxyethoxy)ethyl vinyl ether, 2-(2-(2-ethoxyethoxy)ethoxy)ethyl vinyl ether, 2-(2-(2-methoxyethoxy)ethoxy)ethyl vinyl ether, or 2-(2-(2-ethoxyethoxy)ethoxy)ethoxy ethyl vinyl ether.

The hydrophilic vinyl ether polymer (a) may be a homopolymer containing one selected from the above monomers or a copolymer containing more therefrom. Note that when the hydrophilic vinyl ether polymer (a) is a copolymer, the copolymer may be any of a block copolymer or a random copolymer.

The hydrophilic vinyl ether polymer (a) has a number-average molecular weight of preferably from 2500 to 100000 and more preferably from 5000 to 75000. In addition, the molecular weight distribution is preferably from 1.0 to 5.0 and more preferably from 1.1 to 3.0.

Note that the number-average molecular weight and the molecular weight distribution can be herein measured by, for instance, GPC.

The hydrophobic polymer (b) may be a polymer with low affinity for water.

A monomer as a component of the hydrophobic polymer (b) is preferably a radical-polymerizable hydrophobic monomer and more preferably a hydrophobic monofunctional polymerizable compound.

Examples of the above monomer include an olefin, an aromatic vinyl compound, (meth)acrylic acid, a (meth)acrylic acid derivative, (meth)acrylamide, a (meth)acrylamide derivative, or a vinyl ester of saturated aliphatic carboxylic acid. Among these monomers, preferred are one or more selected from consisting of an aromatic vinyl compound, a (meth)acrylic acid derivative, a (meth)acrylamide derivative, or a vinyl ester of saturated aliphatic carboxylic acid.

The hydrophobic polymer (b) may be a homopolymer containing one selected from the above monomers or a copolymer containing more therefrom. Note that when the hydrophobic polymer (b) is a copolymer, the copolymer may be any of a block copolymer or a random copolymer.

It is preferable to use a $C_{6-14}$ olefin as the above olefin. In addition, the olefin may be a chain olefin or a cyclic olefin. Specific examples of the olefin include hexene, octene, cyclohexene, cyclooctene, or vinylcyclohexene.

As the above aromatic vinyl compound, a compound represented by the following formula (2) is preferable.

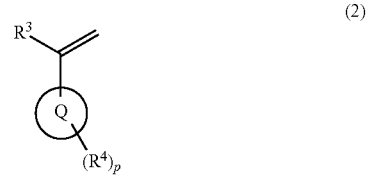

wherein ring Q represents an aromatic ring, $R^3$ represents a hydrogen atom or a methyl group, $R^4$ represents an alkyl group, an alkoxy group, a hydroxyl group, or a halogen atom, and p is an integer of 0 to 4.

In formula (2), as the ring Q, a benzene ring, a naphthalene ring, or a pyridine ring is preferable; a benzene ring or a naphthalene ring is more preferable; and a benzene ring is particularly preferable.

In formula (2), the number of carbon atoms in the alkyl group represented by $R^4$ is preferably from 1 to 4 and more preferably 1 or 2. In addition, the alkyl group may be linear or branched. Specific examples include a methyl group, an ethyl group, an n-propyl group, an isopropyl group, an n-butyl group, an isobutyl group, or a tert-butyl group.

In addition, the number of carbon atoms in the alkoxy group represented by $R^4$ is preferably from 1 to 4 and more preferably 1 or 2. In addition, the alkoxy group may be linear or branched. Specific examples include a methoxy group or an ethoxy group.

In addition, examples of the halogen atom represented by $R^4$ include a fluorine atom, a chlorine atom, or a bromine atom.

In addition, p is an integer of 0 to 4 and is preferably 0 or 1. Note that when p is an integer of 2 to 4, each $R^4$ moieties may be the same or different.

Specific examples of the aromatic vinyl compound include styrene, α-methylstyrene, t-butylstyrene (o, m, p form), t-butoxystyrene (o, m, p form), hydroxystyrene (o, m, p form), or vinylnaphthalene.

As the above (meth)acrylic acid derivative, (meth)acrylic acid ester is preferable, alkyl (meth)acrylate is more preferable, and a compound represented by the following formula (3) is particularly preferable.

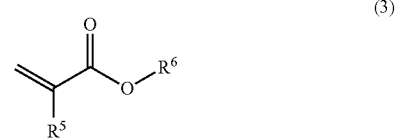

wherein $R^5$ represents a hydrogen atom or a methyl group and $R^6$ represents a $C_{1-10}$ linear or branched alkyl group.

The number of carbon atoms in the alkyl group represented by $R^6$ is preferably from 1 to 8, more preferably from 1 to 6, and particularly preferably from 1 to 4. Specific examples of the above alkyl group include a methyl group, an ethyl group, an n-propyl group, an isopropyl group, an n-butyl group, an isobutyl group, a tert-butyl group, or a 2-ethylhexyl group.

Specific examples of the (meth)acrylic acid derivative include methyl(meth)acrylate, ethyl(meth)acrylate, n-propyl (meth)acrylate, isopropyl(meth)acrylate, n-butyl(meth)acrylate, isobutyl(meth)acrylate, t-butyl(meth)acrylate, or 2-ethylhexyl(meth)acrylate.

As the (meth)acrylamide derivative, N-alkyl(meth) acrylamide or N,N-dialkyl(meth)acrylamide is preferable, and N—$C_{1-10}$ alkyl(meth)acrylamide or N,N-di-$C_{1-10}$ alkyl (meth)acrylamide is more preferable.

Examples of the alkyl group in the N—$C_{1-10}$ alkyl(meth) acrylamide or N,N-di-$C_{1-10}$ alkyl(meth)acrylamide include something like the alkyl group represented by $R^6$.

As the (meth)acrylamide derivative, specific examples include N-methyl(meth)acrylamide, N-ethyl(meth)acrylamide, N-isopropyl(meth)acrylamide, N,N-dimethyl(meth)acrylamide, or N,N-diethyl(meth)acrylamide.

As the vinyl ester of saturated aliphatic carboxylic acid, a compound represented by the following formula (4) is preferable.

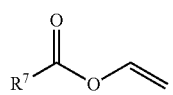

(4)

wherein $R^7$ represents a $C_{1-14}$ linear or branched alkyl group.

The number of carbon atoms in the alkyl group represented by $R^7$ is preferably from 1 to 12, more preferably from 1 to 8, still more preferably from 1 to 4, and particularly preferably 1 or 2. Specific examples of the above alkyl group include a methyl group, an ethyl group, an n-propyl group, an isopropyl group, an n-butyl group, an isobutyl group, a tert-butyl group, a pentyl group, a hexyl group, a heptyl group, an octyl group, a 2-ethylhexyl group, a nonyl group, a decyl group, an undecyl group, or a dodecyl group.

Specific examples of the vinyl ester of saturated aliphatic carboxylic acid include vinyl acetate, vinyl propionate, vinyl hexanoate, or vinyl laurate.

The hydrophobic polymer (b) has a number-average molecular weight of preferably from 2500 to 250000 and more preferably from 8500 to 130000. In addition, the molecular weight distribution is preferably from 1.0 to 5.0 and more preferably from 1.1 to 3.5.

The hydrophilic vinyl ether polymer (a) and the hydrophobic polymer (b) included in each particle of the invention are each preferably a linear polymer. The linear polymer refers to a polymer with a linear molecular structure and involves a concept of polymer structured by a long straight-chain-like main chain and relatively short side chains linked thereto.

In addition, the hydrophilic vinyl ether polymer (a) and the hydrophobic polymer (b) are each preferably a nonionic polymer.

Also, in particles of the invention, part or all of the hydrophilic vinyl ether polymer (a) or the hydrophobic polymer (b) are preferably chemically bonded to each other, and it is more preferable that a terminal of the hydrophilic vinyl ether polymer (a) is chemically bonded to a terminal of the hydrophobic polymer (b).

The average particle size of particles of the invention is preferably 100 nm or more, more preferably 200 nm or more, still more preferably 250 nm or more, and particularly preferably 300 nm or more from the viewpoint of expressing chemical characteristics of the core and preferably 2000 nm or less and more preferably 1500 nm or less from the viewpoint of dispersion stability over time.

The particle size distribution (PDI) is preferably 0.005 or more, more preferably 0.01 or more, and particularly preferably 0.02 or more and preferably 0.9 or less, more preferably 0.8 or less, and particularly preferably 0.7 or less.

The coefficient of variation (CV) is preferably 1% or more, more preferably 2% or more, and particularly preferably 2.5% or more and preferably 7% or less, more preferably 6% or less, and particularly preferably 5.5% or less.

As used herein, the average particle size means a volume-average particle size measured by dynamic light scattering method. The average particle size, the particle size distribution (PDI), and the coefficient of variation (CV) may be measured by procedures described specifically in the below-stated Examples.

The content of the hydrophilic vinyl ether polymer (a) with respect to the total mass of particles of the invention is preferably 5 mass % or more, more preferably 10 mass % or more, and particularly preferably 15 mass % or more and preferably 95 mass % or less, more preferably 90 mass % or less, still more preferably 85 mass % or less, and particularly preferably 80 mass % or less.

The content of the hydrophobic polymer (b) with respect to the total mass of particles of the invention is preferably 5 mass % or more, more preferably 10 mass % or more, still more preferably 15 mass % or more, and particularly preferably 20 mass % or more and preferably 95 mass % or less, more preferably 90 mass % or less, and particularly preferably 85 mass % or less.

The content mass ratio [(a):(b)] between the hydrophilic vinyl ether polymer (a) and the hydrophobic polymer (b) may be selected, if appropriate, depending on a desired particle size and/or usage, and is preferably in a range from 10:1 to 1:10, more preferably in a range of from 7.5:1 to 1:7.5, and particularly preferably in a range from 5:1 to 1:5 from the viewpoint of dispersibility.

Note that the content of the hydrophilic vinyl ether polymer (a) and the content of the hydrophobic polymer (b) may be each measured by centrifuging a particle-containing solution at a rotation speed of about 3000 rpm and then subjecting non-particle components present in the supernatant to $^1$H NMR analysis.

Here, particles of the invention can be produced by a method using neither a surfactant nor a high-molecular-weight azo initiator, exhibit satisfactory dispersibility in aqueous medium, and are useful as, for instance, a dispersant, a metal-protecting stabilizer, or a metal adsorbent. In addition, particles of the invention can be produced in a system in which any decomposition product of a radical polymerization initiator (e.g., an azo-based initiator such as a high-molecular-weight azo initiator) does not occur, and may include particles to which the above decomposition product or a surfactant is neither attached nor left.

Further, regarding particles of the invention, the shell and the core can each be selected, depending on desired performance and/or usage, from a wide variety of the hydrophilic vinyl ether polymer (a) and the hydrophobic polymer (b), respectively. Thus, the particles are applicable to use such as a coating material, an adhesive, a cosmetic, a dispersant for a metal or the like, a resin modifier, a metal-protecting stabilizer, a metal adsorbent/collector, a diagnostic agent (e.g., a latex diagnostic agent), and/or a drug delivery system. Examples of the above metal include Group 8 metal such as ruthenium or osmium; Group 9 metal such as rhodium or iridium; Group 10 metal such as nickel, palladium, or platinum; Group 11 metal such as silver or gold; or any ion thereof. Also, any zero-valent metal may be used. In addition, the above metal may be a metal compound such as HAuCl$_4$ or any ion thereof. Among them, particles of the invention are suitable for dispersion, protective stabilization, and/or adsorption of Group 11 metal(s), Group 11 metal compound(s), or any ions thereof. Note that the protective stabilization of metal(s) refers to stably dispersing the metal (s) in a dispersion medium.

[Method for Producing Particles]

Next, a particle production method of the invention will be described in detail.

A method for producing core/shell type polymeric particles includes a polymerization step of subjecting a hydrophilic vinyl ether polymer and a hydrophobic monomer to emulsion polymerization in an aqueous medium. Particles of the invention can be produced by the particle production method of the invention.

Specific examples of the above emulsion polymerization technique include a technique for carrying out a polymerization reaction by including a hydrophilic vinyl ether polymer, a hydrophobic monomer, an aqueous medium, and a radical polymerization initiator in a flask. In the case of such a technique using a radical polymerization initiator, a hydrogen atom, for instance at a terminal of the hydrophilic vinyl ether polymer is withdrawn by the radical polymerization initiator to generate an active point, from which a hydrophobic polymer (b) is created.

Examples of the hydrophilic vinyl ether polymer include something listed as the hydrophilic vinyl ether polymer (a). Then, as the hydrophilic vinyl ether polymer used in the particle production method of the invention, those having a hydrogen atom(s) at one terminal or both terminals are preferable.

The usage of the hydrophilic vinyl ether polymer with respect to the total 100 parts by mass of the hydrophilic vinyl ether polymer and the hydrophobic monomer is preferably 5 parts by mass or more, more preferably 10 parts by mass or more, and particularly preferably 15 parts by mass or more and preferably 95 parts by mass or less, more preferably 90 parts by mass or less, still more preferably 85 parts by mass or less, and particularly preferably 80 parts by mass or less.

Note that the hydrophilic vinyl ether polymer may be synthesized by using a known procedure. Examples include the procedure described in JP 5936184 B2.

Examples of the hydrophobic monomer include those listed as a monomer as a component of the hydrophobic polymer (b).

The usage of the hydrophobic monomer with respect to the total 100 parts by mass of the hydrophilic vinyl ether polymer and the hydrophobic monomer is preferably 5 parts by mass or more, more preferably 10 parts by mass or more, still more preferably 15 parts by mass or more, and particularly preferably 20 parts by mass or more and preferably 95 parts by mass or less, more preferably 90 parts by mass or less, and particularly preferably 85 parts by mass or less.

Note that the total usage of the hydrophilic vinyl ether polymer and the hydrophobic monomer with respect to the total amount of polymerizable compounds (provided that the polymerizable compounds include a polymer(s) and a non-polymer(s)) is preferably from 90 to 100 mass %, more preferably from 95 to 100 mass %, and particularly preferably 99 to 100 mass %.

The above radical polymerization initiator is not particularly limited and is preferably a water-soluble polymerization initiator that generates radicals after heating. In addition, from the viewpoint of low toxicity, for instance, any initiator other than high-molecular-weight azo initiators is preferable, and a radical polymerization initiator for non-polymer or a non-polymerizable radical polymerization initiator is more preferable.

Examples of the radical polymerization initiator include: an azo-based polymerization initiator such as 2,2'-azobis[2-(2-imidazolin-2-yl)propane]dihydrochloride, 2,2'-azobis(2-methylpropionamidine)dihydrochloride, 2,2'-azobis[N-(2-carboxyethyl)-2-methylpropionamidine]tetrahydrate, 2,2'-azobis[2-(2-imidazolin-2-yl)propane], 2,2'-azobis[2-methyl-N-(2-hydroxyethyl)propionamide], or 4,4'-azobis(4-cyanovaleric acid); or an organic peroxide such as cumene hydroperoxide, di-t-butyl peroxide, t-butyl hydroperoxide, or t-butyl peroxyacetate. One of the radical polymerization initiator may be used singly, or more thereof may be used in combination.

Note that the above radical polymerization initiator is used for withdrawing, for instance, a hydrogen atom from a terminal of the hydrophilic vinyl ether polymer. When the above radical polymerization initiator is used, a decomposition product of the initiator is neither attached nor left on the resulting particles.

The usage of the radical polymerization initiator with respect to 100 parts by mass of the hydrophobic monomer is preferably from 0.01 to 50 parts by mass, more preferably from 0.1 to 10 parts by mass, still more preferably from 0.5 to 5 parts by mass, and particularly preferably from 0.5 to 2.5 parts by mass. The particle production method of the invention allows particles of the invention to be efficiently produced even if the radical polymerization initiator is at such a low concentration.

Examples of the above aqueous medium include: water; a monohydric alcohol-based solvent such as methanol, ethanol, or isopropanol; a polyhydric alcohol-based solvent such as ethylene glycol; or an amide-based solvent such as N,N-dimethylformamide. One of them may be used singly, or more thereof may be used in combination. Note that in the case of a mixed solvent, it is preferable that the volume of water with respect to the total volume of the aqueous medium is 50% (v/v) or more.

Among the aqueous media, preferred is a mixed solvent containing one or more selected from consisting of water, a solvent containing water and monohydric alcohol, a polyhydric alcohol-based solvent, or an amide-based solvent. Water is more preferable.

The usage of the aqueous medium may be selected, if appropriate, depending on a desired particle size and/or purpose. Here, the usage with respect to the total 100 parts by mass of the hydrophilic vinyl ether polymer and the hydrophobic monomer is preferably from 100 to 3000 parts by mass and more preferably from 200 to 2500 parts by mass.

In addition, it is preferable that the proportions of respective components used in 100 parts by mass of the polymerization reaction solution during the polymerization step are set such that the total of the hydrophilic vinyl ether polymer and the hydrophobic monomer is from 5 to 30 parts by mass, the radical polymerization initiator is from 0.1 to 3 parts by mass, and the aqueous medium is from 70 to 90 parts by mass.

In addition, it is preferable that the polymerization step is carried out in the absence of a surfactant from the viewpoint of reducing an environmental burden.

In addition, the reaction temperature during the polymerization step is preferably from 20 to 100° C. and more preferably from 40 to 80° C.

The reaction time of the polymerization step varies depending on the kind of reagent, the volume, and the reaction temperature, and is preferably from 2 to 50 h and more preferably from 3 to 30 h.

In addition, it is preferable that the polymerization step is carried out while stirring. The stirring rate is preferably as fast as possible so as to impart significant shear force to a polymerization reaction solution. For instance, in the case of stirring in a Schlenk flask by using a stirring bar, the stirring rate is preferably 600 rpm or higher.

Here, when neither a surfactant nor a high-molecular-weight azo initiator is used in a particle production method of the invention, core/shell type polymeric particles, which exhibit satisfactory dispersibility in aqueous medium and are useful as, for instance, a dispersant, a metal-protecting stabilizer, or a metal adsorbent, can be produced in a simple and industrially advantageous fashion.

[Dispersion of Particles]

A particle dispersion of the invention contains particles of the invention dispersed therein.

As a dispersion medium, something like the aqueous medium used in the above polymerization step is preferable. The concentration of the particles with respect to the total mass of the particle dispersion is preferably from 0.01 to 30 mass %, more preferably from 1 to 25 mass %, and particularly preferably from 5 to 20 mass %.

In addition, the particle dispersion of the invention may be obtained by dispersing a metal together with particles of the invention. Examples of the above metal include Group 8 metal such as ruthenium or osmium; Group 9 metal such as rhodium or iridium; Group 10 metal such as nickel, palladium, or platinum; Group 11 metal such as silver or gold; or any ion thereof. Also, any zero-valent metal may be used. In addition, the above metal may be a metal compound such as $HAuCl_4$ or any ion thereof. Among them, a Group 11 metal, a Group 11 metal compound, or any ion thereof is preferable.

EXAMPLES

Hereinafter, the invention will be described in detail with reference to Examples. However, the invention is not limited to these Examples. Note that measurements in Examples below were conducted in accordance with the following measurement protocols.

<Measurement by Scanning Electron Microscope (SEM)>

In SEM measurement, an S-2600H, manufactured by Hitachi High-Tech Corporation, was used; a sample (an aqueous dispersion of particles) was put on a carbon tape immobilized to an aluminum sample table and sufficiently dried in the air; and gold vapor deposition was then performed.

<Measurement by Transmission Electron Microscope (TEM)>

TEM measurement was conducted using a JEM2100, manufactured by JEOL Ltd., (Gatan ORIUS SC200D equipped with a CCD camera) at an acceleration voltage of 200 kV. In addition, 5 µL of aqueous dispersion containing particles was added dropwise onto a carbon-coated copper grid (ELS-C10, Okenshoji Co., Ltd.), a surface of which had been subjected to hydrophilization treatment using glow discharge; excessive dispersion liquid was removed; negative staining was then conducted using an EM Stainer (Nisshin EM Co., Ltd.); and the resulting grid was dried to give a sample for use and measurement.

<Measurement of Particle size by Dynamic Light Scattering (DLS)>

The particle size was measured by DLS at a scattering angle of 173 degrees while a Zetasizer Nano-ZSP, manufactured by Malvern, Inc., was used. The measured data was analyzed by a cumulant method using Zeta Software Ver.7.02 to calculate the particle size ($D_h$) and the particle size distribution (PDI). In addition, the resulting average particle size was obtained after nine or more measurements, and the coefficient of variation (CV) was calculated from the standard deviation of the particle size measurement results thus obtained.

<IR Measurement>

IR measurement was conducted using an FTS-3000, manufactured by Varian, Inc. In addition, the sample used was particles obtained by centrifuging particles for 30 min at 3000 rpm and then drying the resulting precipitate. Then, a KBr tablet method (Examples 6, 10, and 12) or a $CaF_2$ casting method (Example 11) was used for the measurement.

<$^1$H NMR Measurement>

$^1$H NMR measurement was conducted using a JNM-ECX500, manufactured by JEOL Ltd. In addition, the sample used for measurement was prepared by centrifuging particles for 30 min at 3000 rpm and then dispersing the resulting precipitate into heavy water (Examples 6 and 10 to 12).

Example 1: Production of Core/Shell Type Polymeric Particles Containing Polyvinyl Acetate as Core and Poly(2-Hydroxyethyl Vinyl Ether) as Shell To a Schlenk flask were added a stirring bar, 0.2 g (2.3 mmol in terms of 2-hydroxyethyl vinyl ether monomer) of poly(2-hydroxyethyl vinyl ether) synthesized by a known technique (hereinafter, referred to as "PHEVE"; in Examples 1 to 12, a polymer with a number-average molecular weight of 36500 and a molecular weight distribution of 1.97 as measured by GPC using DMF+10 mM LiBr as an eluent, was used), 1.0 g (11.6 mmol) of vinyl acetate (hereinafter, referred to as "VAc"), 5.0 g (280 mmol) of ion-exchanged water, and 10 mg (0.04 mmol; 1 part by mass with respect to 100 parts by mass of the vinyl acetate monomer) of 2,2'-azobis(2-methylpropionamidine)dihydrochloride ("V-50", manufactured by Wako Pure Chemical Corporation; hereinafter, referred to as "RIBA"). The resulting mixture was subjected to freeze-deaeration 3 times, and then was stirred at 600 rpm while heated at 60° C. for 24 h. After polymerization, the air was injected into the Schlenk flask, which was then cooled to stop the polymerization. This process produced core/shell type polymeric particles containing polyvinyl acetate as a core and PHEVE as a shell.

The particles had a particle size ($D_h$) of 696 nm, a particle size distribution (PDI) of 0.20, and a coefficient of variation (CV) of 2.7% as obtained by measuring the particle size by DLS.

Example 2

The same protocol as in Example 1 was repeated, except that the usage of VAc and the usage of AIBA were changed to 0.5 g and 5 mg, respectively, to synthesize core/shell type polymeric particles.

The resulting particles had a particle size ($D_h$) of 831 nm, a particle size distribution (PDI) of 0.15, and a coefficient of variation (CV) of 3.0%.

Example 3

The same protocol as in Example 1 was repeated, except that the usage of VAc and the usage of AIBA were changed to 0.25 g and 2.5 mg, respectively, to synthesize core/shell type polymeric particles.

The resulting particles had a particle size (Dd of 702 nm, a particle size distribution (PDI) of 0.21, and a coefficient of variation (CV) of 3.1%.

Example 4

The same protocol as in Example 1 was repeated, except that the usage of PHEVE, the usage of VAc, and the usage of AIBA were changed to 0.1 g, 0.5 g, and 5 mg, respectively, to synthesize core/shell type polymeric particles.

The resulting particles had a particle size ($D_h$) of 1021 nm, a particle size distribution (PDI) of 0.18, and a coefficient of variation (CV) of 2.9°.

Example 5

The same protocol as in Example 1 was repeated, except that the usage of PHEVE, the usage of VAc, and the usage of AIBA were changed to 0.05 g, 0.25 g, and 2.5 mg, respectively, to synthesize core/shell type polymeric particles.

The resulting particles had a particle size ($D_h$) of 725 nm, a particle size distribution (PDI) of 0.02, and a coefficient of variation (CV) of 2.8%.

FIG. 1 shows DLS data of Examples 1 to 5.

Example 6

The same protocol as in Example 1 was repeated, except that the usage of PHEVE, the usage of VAc, the usage of AIBA, and the usage of ion-exchanged water were changed to 0.05 g, 0.2 g, 2 mg, and 4.75 g, respectively, to synthesize core/shell type polymeric particles.

The resulting particles had a particle size ($D_h$) of 666 nm, a particle size distribution (PDI) of 0.16, and a coefficient of variation (CV) of 3.2%.

Figure 2:
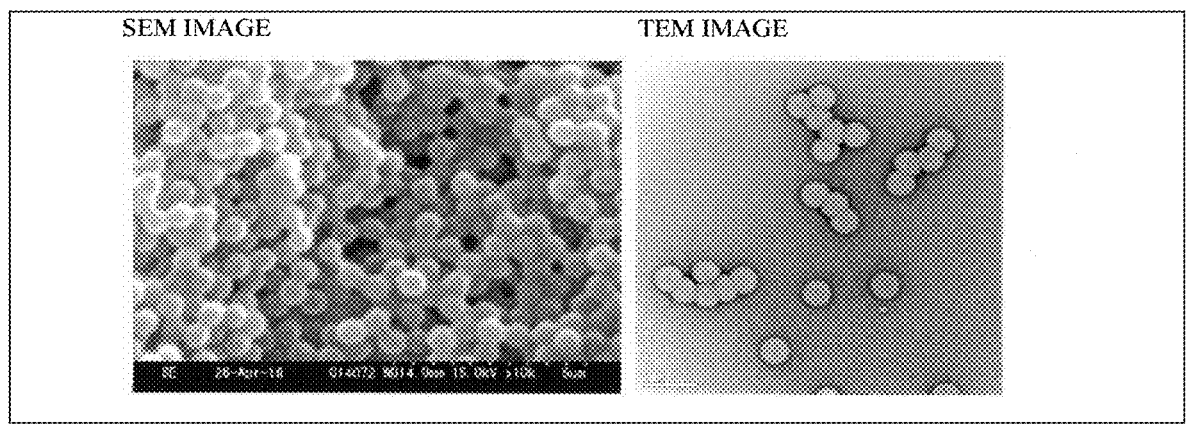
FIG. 2 is an SEM image and a TEM image of particles obtained in Example 6.
Figure 3:
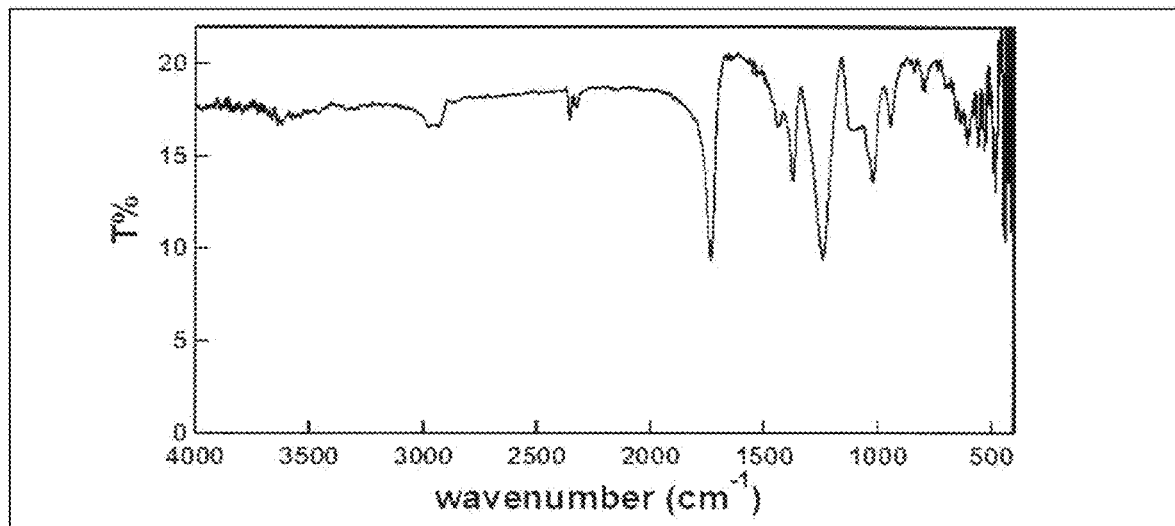
FIG. 3 is a chart showing an IR spectrum of the particles obtained in Example 6.
Figure 4:
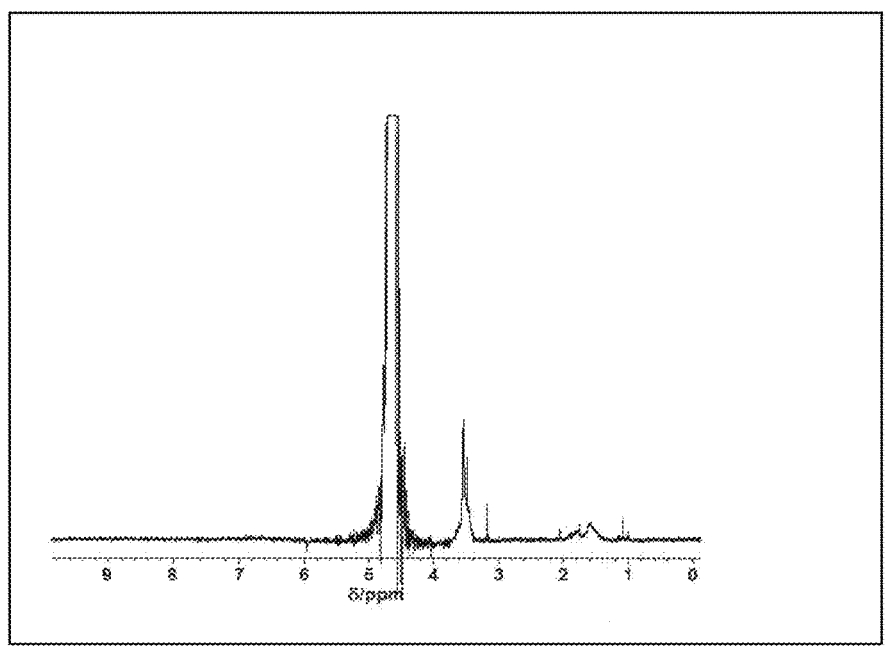
FIG. 4 is a chart showing a $^1$H NMR spectrum of the particles obtained in Example 6.

FIG. 2 shows an SEM image and a TEM image of particles obtained in Example 6; FIG. 3 shows the IR spectrum; and FIG. 4 shows the $^1$H NMR spectrum.

In the IR spectrum (FIG. 3), peaks assigned to hydroxyl groups of PHEVE were observed at or near 3500 cm$^{-1}$ and a peak assigned to a carbonyl group of polyvinyl acetate was observed at 1700 cm$^{-1}$. This has demonstrated the presence of PHEVE and polyvinyl acetate in the particles.

In the $^1$H NMR spectrum (FIG. 4), there was no observed polyvinyl acetate-derived signal and just a PHEVE-derived signal was recorded (at or near 3.5 ppm). The NMR signals are affected by the movement of nuclear. Accordingly, just PHEVE having superior movement in heavy water was observed and polyvinyl acetate having poor movement was unobserved. From this result, the results of IR spectrum, and the SEM and TEM images, it found that the particles obtained in Example 6 each had, in water, a core/shell structure having polyvinyl acetate as a core and PHEVE as a shell.

Example 7

The same protocol as in Example 1 was repeated, except that the usage of PHEVE, the usage of VAc, the usage of RIBA, and the usage of ion-exchanged water were changed to 0.1 g, 0.15 g, 2 mg, and 4.75 g, respectively, to synthesize core/shell type polymeric particles.

The resulting particles had a particle size ($D_h$) of 857 nm, a particle size distribution (PDI) of 0.17, and a coefficient of variation (CV) of 3.1%.

Example 8

The same protocol as in Example 1 was repeated, except that the usage of PHEVE, the usage of VAc, the usage of AIBA, and the usage of ion-exchanged water were changed to 0.15 g, 0.1 g, 2 mg, and 4.75 g, respectively, to synthesize core/shell type polymeric particles.

The resulting particles had a particle size ($D_h$) of 1387 nm, a particle size distribution (PDI) of 0.18, and a coefficient of variation (CV) of 3.1%.

Example 9

The same protocol as in Example 1 was repeated, except that the usage of PHEVE, the usage of VAc, the usage of AIBA, and the usage of ion-exchanged water were changed to 0.2 g, 0.05 g, 2 mg, and 4.75 g, respectively, to synthesize core/shell type polymeric particles.

The resulting particles had a particle size (Dd of 299 nm, a particle size distribution (PDI) of 0.16, and a coefficient of variation (CV) of 5.4%.

Figure 5:
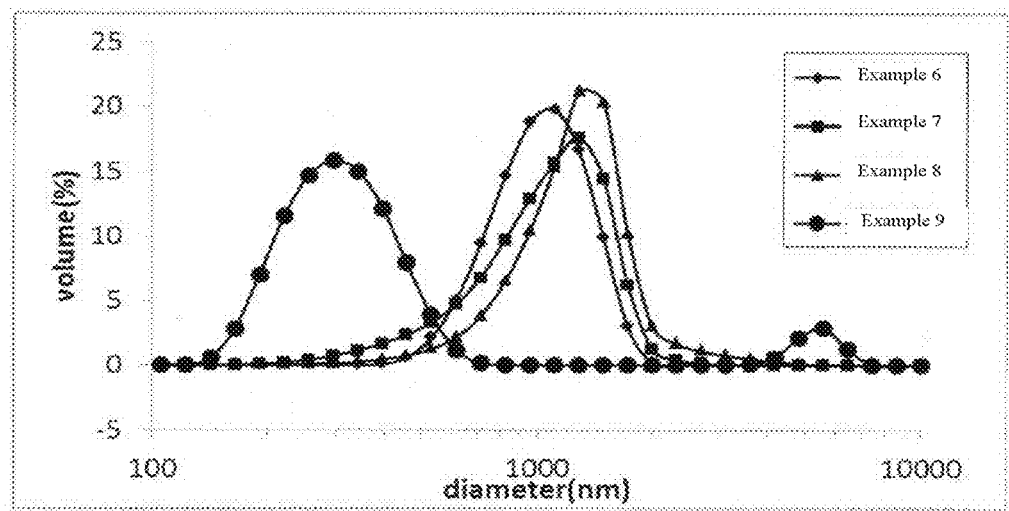
FIG. 5 is a graph showing DLS data of particles obtained in Examples 6 to 9.

FIG. 5 shows DLS data of Examples 6 to 9.

Example 10: Production of Core/Shell Type Polymeric Particles Containing Polystyrene as Core and PHEVE as Shell To a short Schlenk flask were added a stirring bar, 0.05 g (0.6 mmol in terms of 2-hydroxyethyl vinyl ether monomer) of PHEVE synthesized by a known technique, 0.2 g (1.9 mmol) of styrene, 4.75 g (260 mmol) of ion-exchanged water, and 2 mg (0.007 mmol; 1 part by mass with respect to 100 parts by mass of the styrene monomer) of AIBA. The resulting mixture was subjected to freeze-deaeration 3 times, and then was stirred at 600 rpm while heated at 60° C. for 24 h. After polymerization, the air was injected into the Schlenk flask, which was then cooled to stop the polymerization. This process produced core/shell type polymeric particles containing polystyrene as a core and PHEVE as a shell.

The particles had a particle size ($D_h$) of 567 nm, a particle size distribution (PDI) of 0.22, and a coefficient of variation (CV) of 3.5% as obtained by measuring the particle size by DLS.

Example 11: Production of Core/Shell Type Polymeric Particles Containing Polyethylacrylate as Core and PHEVE as Shell The same protocol as in Example 10 was repeated, except that styrene was changed to 0.2 g (2.0 mmol) of ethyl acrylate, to synthesize core/shell type polymeric particles.

The resulting particles had a particle size ($D_h$) of 546 nm, a particle size distribution (PDI) of 0.02, and a coefficient of variation (CV) of 3.6%.

Example 12: Production of Core/Shell Type Polymeric Particles Containing Polymethylmethacrylate as Core and PHEVE as Shell The same protocol as in Example 10 was repeated, except that styrene was changed to 0.2 g (2.0 mmol) of methyl methacrylate, to synthesize core/shell type polymeric particles.

The resulting particles had a particle size ($D_h$) of 697 nm, a particle size distribution (PDI) of 0.69, and a coefficient of variation (CV) of 3.1%.

Figure 6:
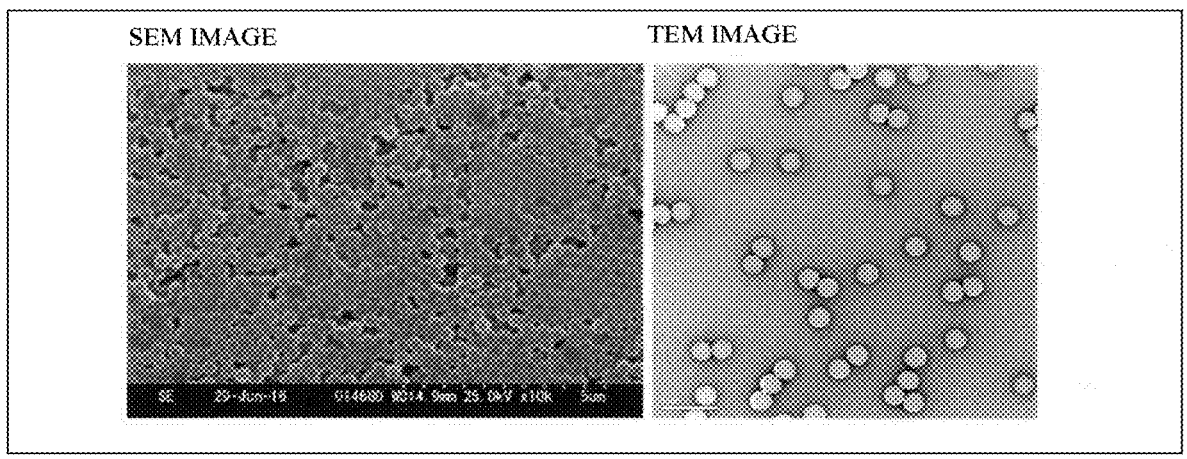
FIG. 6 is an SEM image and a TEM image of particles obtained in Example 10.
Figure 7:
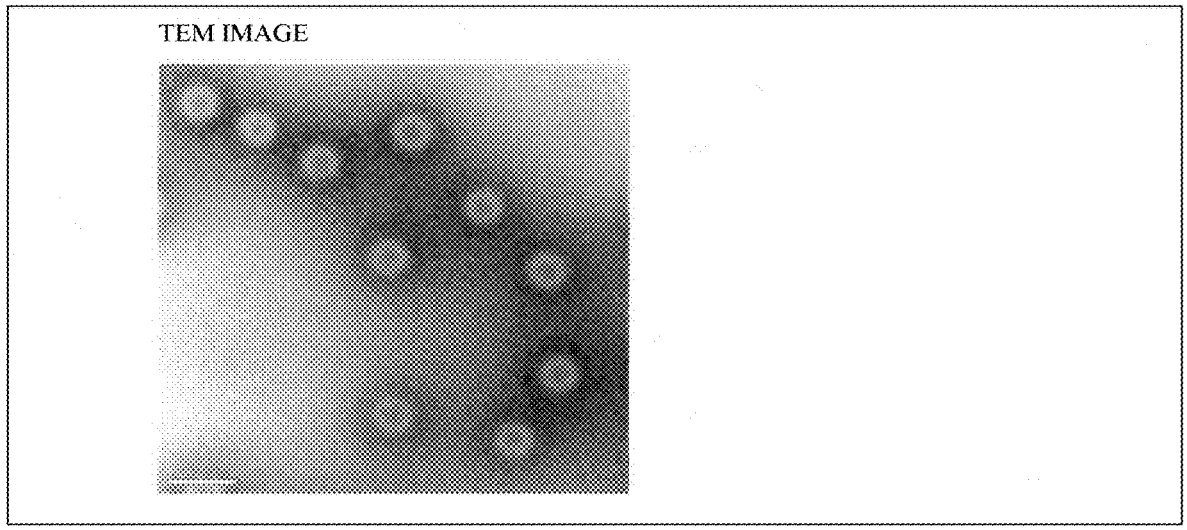
FIG. 7 is a TEM image of particles obtained in Example 11.
Figure 8:
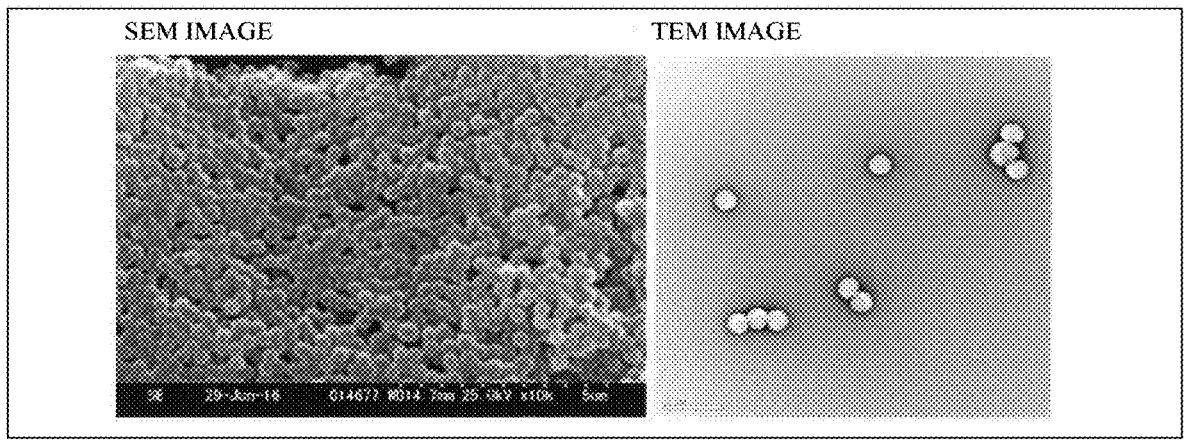
FIG. 8 is an SEM image and a TEM image of particles obtained in Example 12.
Figure 9:
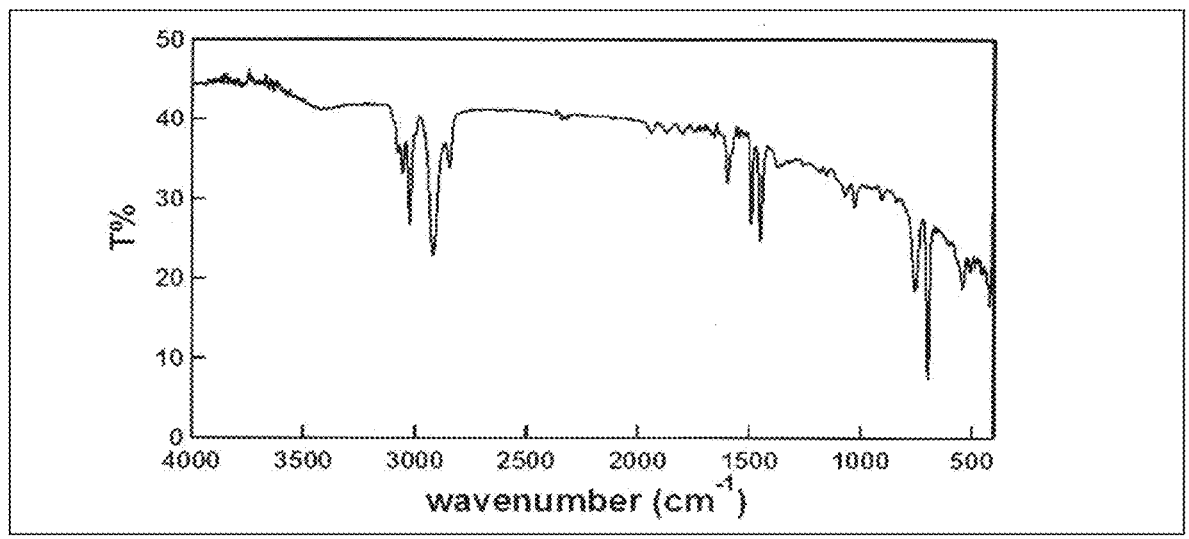
FIG. 9 is a chart showing an IR spectrum of the particles obtained in Example 10.
Figure 10:
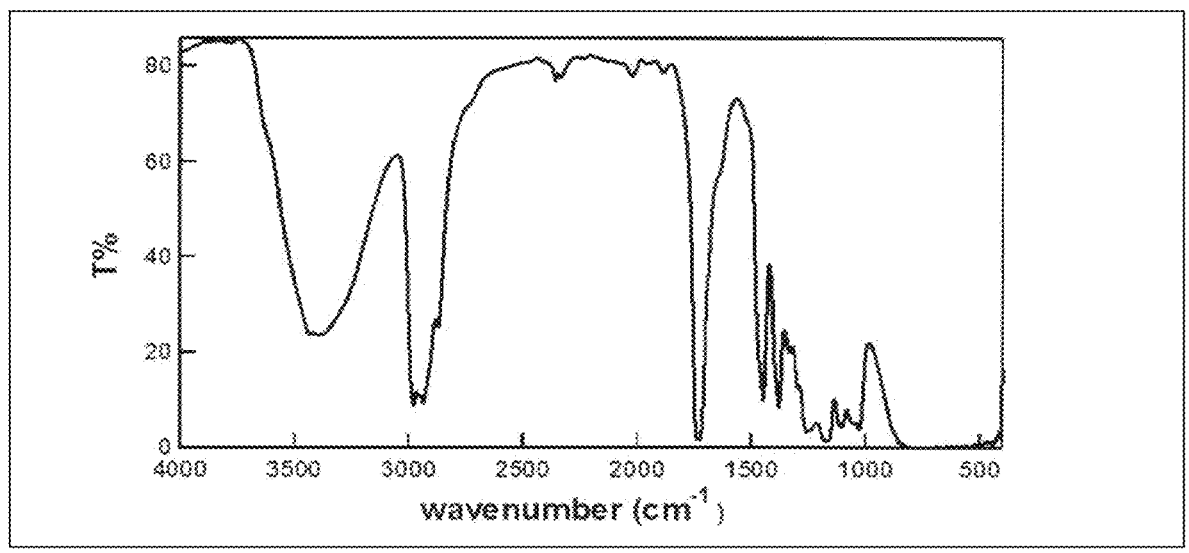
FIG. 10 is a chart showing an IR spectrum of the particles obtained in Example 11.
Figure 11:
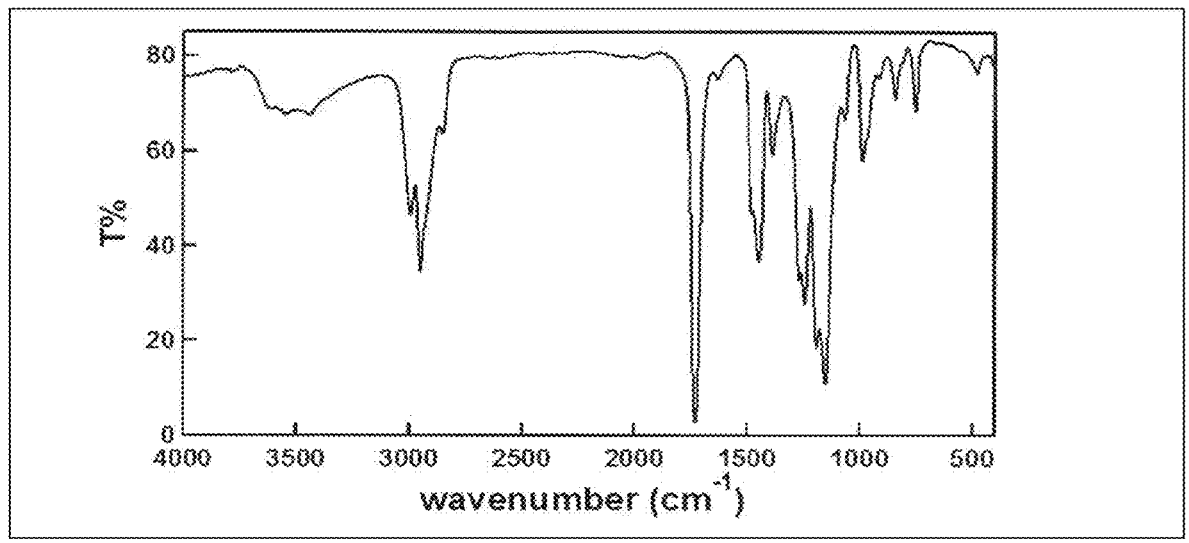
FIG. 11 is a chart showing an IR spectrum of the particles obtained in Example 12.
Figure 12:
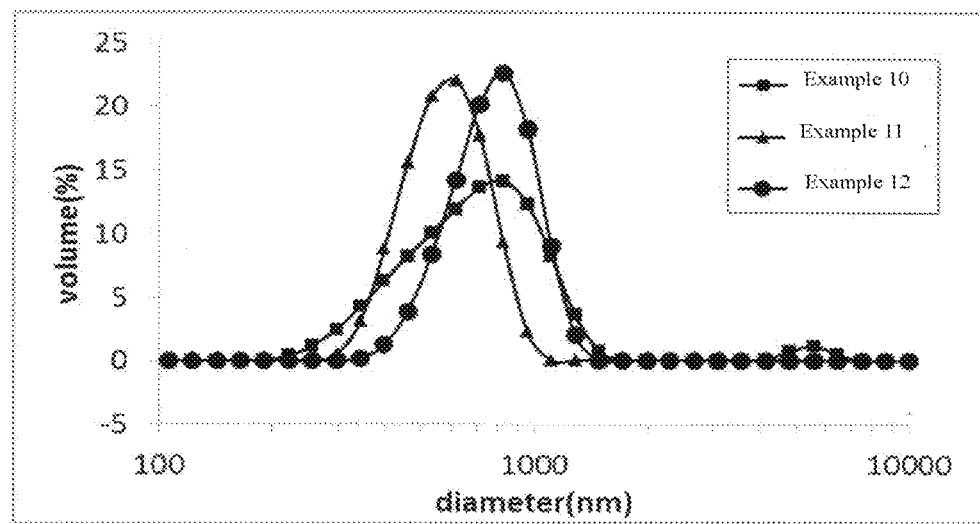
FIG. 12 is a graph showing DLS data of the particles obtained in Examples 10 to 12.
Figure 13:
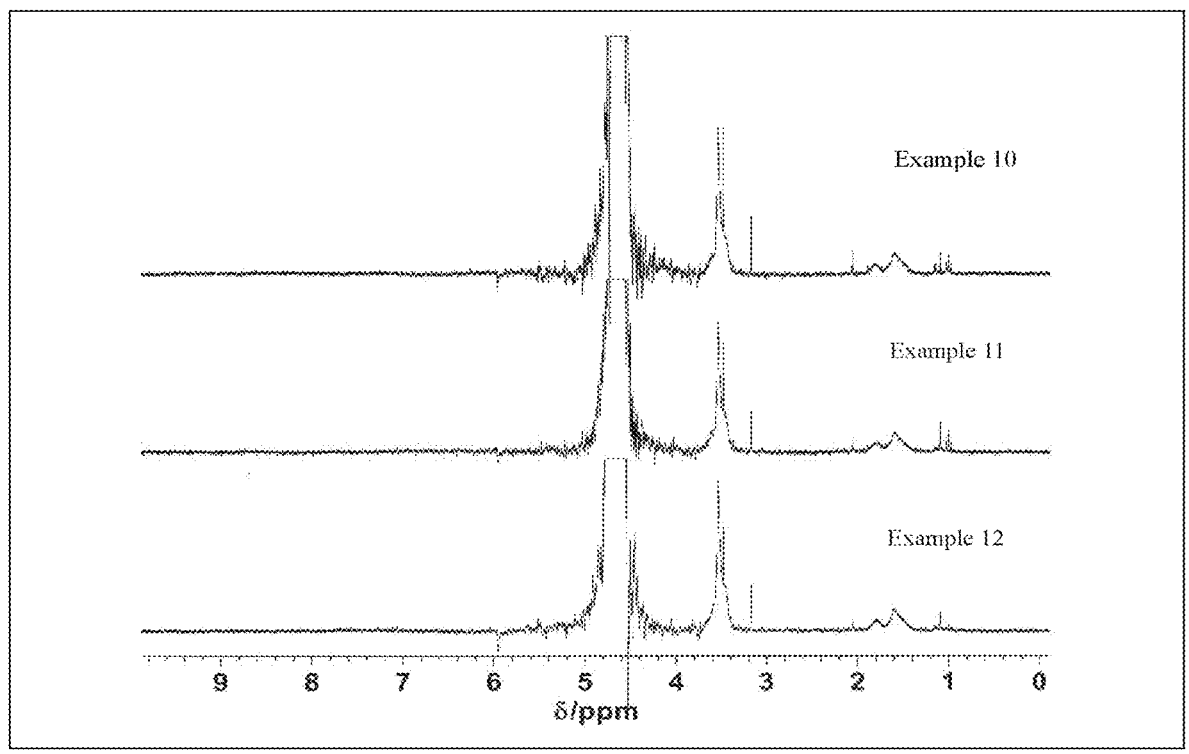
FIG. 13 is a chart showing $^1$H NMR spectra of the particles obtained in Examples 10 to 12.

FIGS. 6 to 8 show SEM images and TEM images (only a TEM image in Example 11) of particles obtained in Examples 10 to 12; FIGS. 9 to 11 show the IR spectra; FIG. 12 shows the DLS data; and FIG. 13 shows the $^1$H NMR spectra.

Regarding the IR spectra (FIGS. 9 to 11), peaks assigned to hydroxyl groups of PHEVE were observed at or near 3500 cm$^{-1}$ in any of the spectra in Examples 10 to 12. In addition, a peak assigned to a carbonyl group of polyethylacrylate or polymethylmethacrylate was recorded at or near 1700 cm$^{-1}$ in the spectrum in Example 11 or 12. This indicated the presence of PHEVE and polyethylacrylate or polymethylmethacrylate in the particles.

Regarding the $^1$H NMR spectra (FIG. 13), no signal derived from a polymer as a component of the core was observed in any of the spectra in Examples 10 to 12. Just a PHEVE-derived signal was recorded. The NMR signals are affected by the movement of nuclear. Accordingly, PHEVE having superior movement in heavy water was observed and any of polystyrene, polyethylacrylate, or polymethylmethacrylate, which has poor movement, was hardly observed. From this result, the results of IR spectra, and the SEM and TEM images, it found that the particles obtained in Examples 10 to 12 each had a core/shell structure having polystyrene, polyethylacrylate, or polymethylmethacrylate as a core and PHEVE as a shell.

Example 13: Production of Core/Shell Type Polymeric Particles Containing Polystyrene as Core and Poly(2-Methoxyethyl(Vinyl)Ether) as Shell To a short Schlenk flask were added a stirring bar, 0.05 g (0.5 mmol in terms of 2-methoxyethyl(vinyl)ether monomer) of poly(2-methoxyethyl(vinyl)ether) synthesized by a known technique (hereinafter, referred to as "PMOVE"; a polymer with a number-average molecular weight of 11500 and a molecular weight distribution of 1.49 as measured by GPC using DMF+10 mM LiBr as an eluent, was used), 0.2 g (1.9 mmol) of styrene, 4.75 g (260 mmol) of ion-exchanged water, and 2 mg (0.007 mmol; 1 part by mass with respect to 100 parts by mass of the styrene monomer) of AIBA. The resulting mixture was subjected to freeze-de-aeration 3 times, and then was stirred at 600 rpm while heated at 60° C. for 24 h. After polymerization, the air was injected into the Schlenk flask, which was then cooled to stop the polymerization. This process produced core/shell type polymeric particles containing polystyrene as a core and PMOVE as a shell.

The particles had a particle size ($D_h$) of 445 nm, a particle size distribution (PDI) of 0.21, and a coefficient of variation (CV) of 3.9% as obtained by measuring the particle size by DLS.

Figure 14:
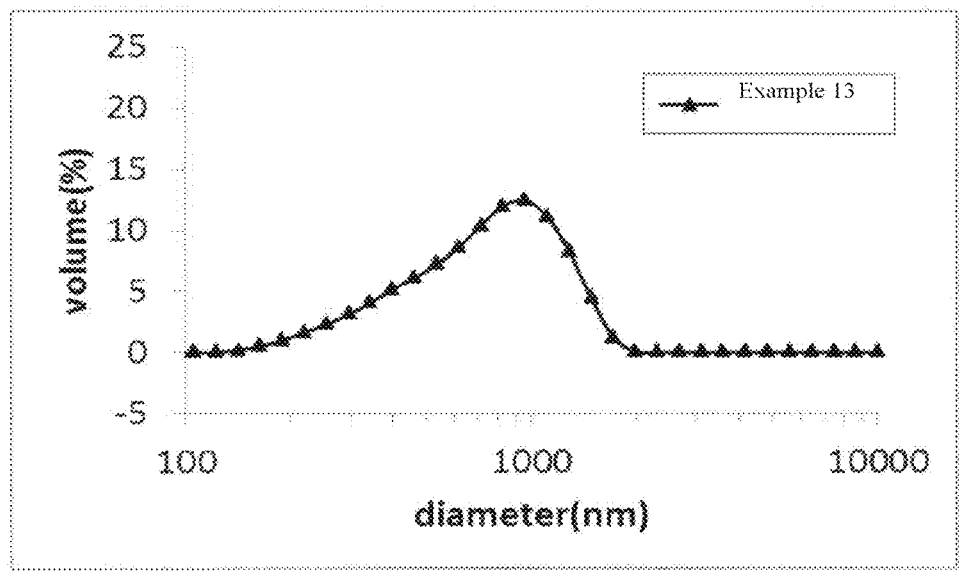
FIG. 14 is a graph showing DLS data of particles obtained in Example 13.
Figure 15:
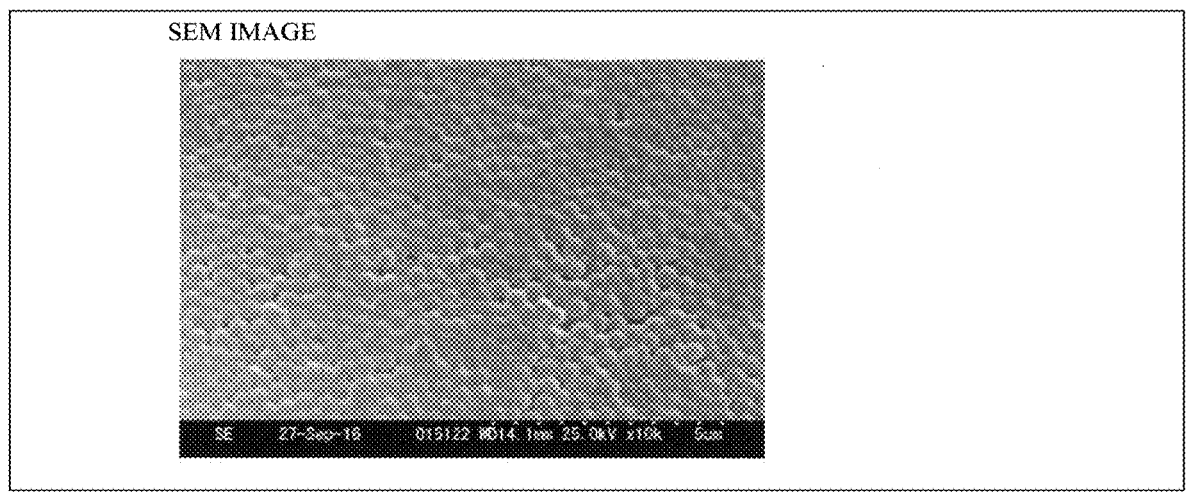
FIG. 15 is an SEM image of the particles obtained in Example 13.

FIG. 14 shows DLS data of particles obtained in Example 13, and FIG. 15 shows an SEM image thereof.

Test Example 1: Dispersion Stability Verification Test

The particles obtained in Example 6 and water were mixed to prepare 1.0 mass % aqueous dispersion. In addition, a dispersion of particles obtained in Example 10 and a dispersion of particles obtained in Example 13 were likewise prepared.

Next, each dispersion (emulsion) was allowed to stand at room temperature. After 120 days had passed since the standing on a shelf, the state of dispersion was visually observed. Each dispersion had no precipitated particles and was still in a dispersed (emulsified) state.

Figure 16:
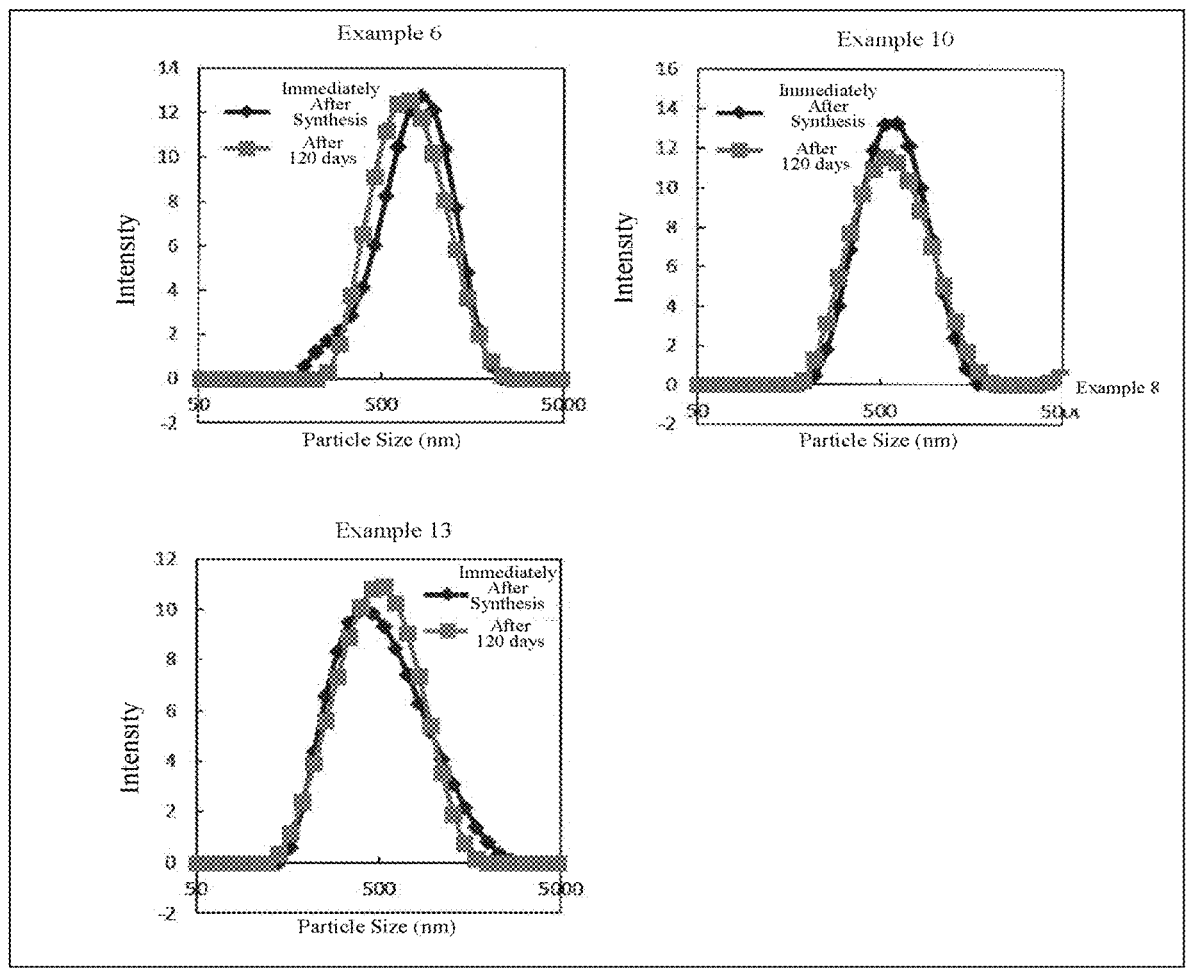
FIG. 16 is graphs showing DLS data measured in Test Example 1.

In addition, the respective particles immediately after the synthesis (before allowed to stand) and particles in each dispersion after 120 days had passed since the standing on a shelf were measured by DLS and compared with respect to the particle size distribution. Then, there was no big change in the particle size distribution after 120 days had passed. FIG. 16 shows DLS data (scattering intensity data).

Test Example 2

The particles obtained in Example 13 and water were mixed to prepare an aqueous dispersion containing 0.05 mass % of the particles obtained in Example 13. The ultraviolet-visible spectrum (FIG. 17, b: Particles) was measured with an ultraviolet-visible spectrophotometer (JASCO V-550).

Figure 17:
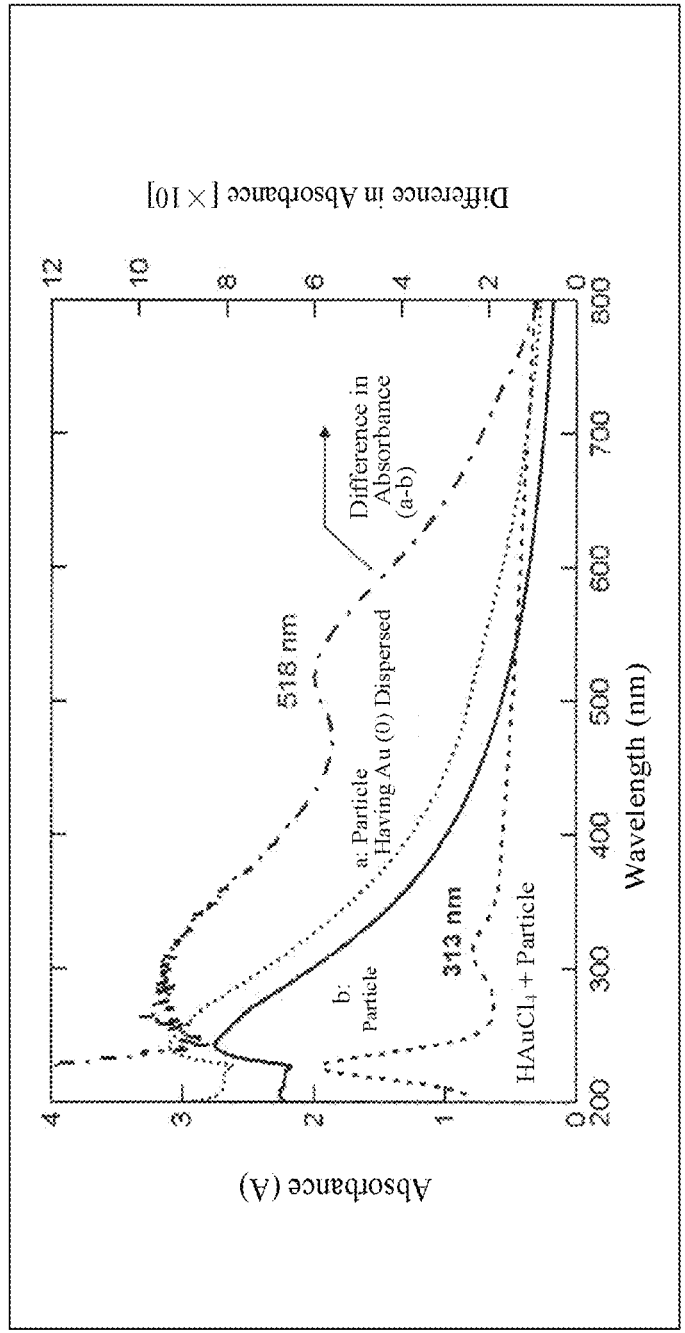
FIG. 17 is a graph showing ultraviolet-visible absorption spectra measured in Test Example 2.

Next, 0.097 mL of 1000 ppm gold standard solution (manufactured by Wako Pure Chemical Corporation) was added to 5 g of the above aqueous dispersion. The resulting mixture was stirred for about 5 min, and the ultraviolet-visible spectrum (FIG. 17, HAuCl$_4$+ Particles) was measured with an ultraviolet-visible spectrophotometer (JASCO V-550). As shown in FIG. 17, absorption at 313 nm of this spectrum revealed incorporation of an ion of gold compound (HAuCl$_4$) in the particles.

In addition, when the above ion of gold compound was directly reduced using sodium borohydride, the whole dispersion was colored pale reddish brown, indicating that zero-valent gold was directly nano-dispersed. Further, the ultraviolet-visible spectrum of the reduced particles (FIG. 17, a: Particles having Au(0) dispersed) was measured with an ultraviolet-visible spectrophotometer (JASCO V-550). Dispersion of zero-valent gold was found from absorption at 518 nm as demonstrated by a difference (a–b) in absorbance between (a) Particles having Au(0) dispersed and (b) Particles in FIG. 17.

From the results of Test Example 2, it found that the particles obtained in Example 13 are useful as, for instance, a metal ion dispersant, a metal-protecting stabilizer, or a metal adsorbent.

The invention claimed is:

1. A core/shell type polymeric particle, comprising
a shell comprising a hydrophilic vinyl ether polymer (a); and
a core comprising a hydrophobic polymer (b),
wherein a monomer as a component of the hydrophobic polymer (b) is one or more of monomers selected from the group consisting of an olefin, an aromatic vinyl compound, (meth) acrylic acid, a (meth) acrylic acid derivative, (meth) acrylamide, a (meth) acrylamide derivative, and a vinyl ester of saturated aliphatic carboxylic acid,
wherein the hydrophilic vinyl ether polymer (a) and the hydrophobic polymer (b) are each a linear polymer,
wherein a terminal of the hydrophilic vinyl ether polymer (a) is chemically bonded to a terminal of the hydrophobic polymer (b),
wherein the core/shell type polymeric particle has a mass ratio of the hydrophilic vinyl ether polymer (a) to the hydrophobic polymer (b) of 1:10 to 10:1,
wherein the core/shell type polymeric particle has an average particle size of from 250 to 2000 nm, and wherein the core/shell type polymeric particle has a polydispersity index (PDI) of greater than 0.1.

2. The particle according to claim 1, wherein the shell is composed of the hydrophilic vinyl ether polymer (a) and the core is composed of the hydrophobic polymer (b).

3. The particle according to claim 1, wherein the hydrophilic vinyl ether polymer (a) is represented by the following formula (1):

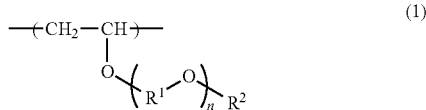

wherein $R^1$ represents a $C_{1-5}$ alkanediyl group, $R^2$ represents a hydrogen atom or a $C_{1-3}$ alkyl group, and n is an integer of 1 to 10.

4. A core/shell type polymeric particle according to claim 1, made by a method comprising subjecting a hydrophilic vinyl ether polymer and a hydrophobic monomer which is one or more of a monomer selected from the group consisting of an olefin, an aromatic vinyl compound, (meth) acrylic acid, a (meth) acrylic acid derivative, (meth) acrylamide, a (meth) acrylamide derivative, and a vinyl ester of saturated aliphatic carboxylic acid to emulsion polymerization in an aqueous medium.

5. A core/shell type polymeric particle according to claim 4, wherein the hydrophilic vinyl ether polymer is represented by the following formula (1):

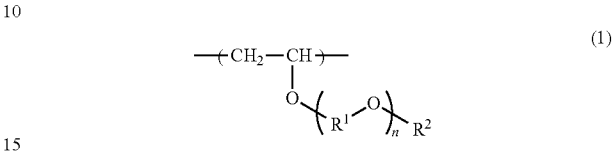

wherein $R^1$ represents a $C_{1-5}$ alkanediyl group, $R^2$ represents a hydrogen atom or a $C_{1-3}$ alkyl group, and n is an integer of 1 to 10.

6. The particle according to claim 1, wherein the core/shell type polymeric particle has a polydispersity index (PDI) of 0.15 to 0.9.

* * * * *